(12) United States Patent
Dinn

(10) Patent No.: US 9,436,354 B2
(45) Date of Patent: *Sep. 6, 2016

(54) PROCESS AND APPARATUS FOR SELECTING AN ITEM FROM A DATABASE

(71) Applicant: Kannuu Pty Ltd, Brisbane, Queensland (AU)

(72) Inventor: Kevin Dinn, Mt. Kuring-gai (AU)

(73) Assignee: Kannuu Pty Ltd, Brisbane, Queensland (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/627,914

(22) Filed: Feb. 20, 2015

(65) Prior Publication Data

US 2015/0169150 A1   Jun. 18, 2015

Related U.S. Application Data

(63) Continuation of application No. 14/166,465, filed on Jan. 28, 2014, now Pat. No. 8,996,579, which is a continuation of application No. 13/736,548, filed on Jan. 8, 2013, now Pat. No. 8,676,852, which is a continuation of application No. 13/349,204, filed on Jan. 12, 2012, now Pat. No. 8,375,058, which is a continuation of application No. 11/990,338, filed as application No. PCT/AU2006/001151 on Aug. 11, 2006, now Pat. No. 8,140,560.

(30) Foreign Application Priority Data

Aug. 12, 2005  (AU) ................. 2005904378

(51) Int. Cl.
| | |
|---|---|
| *G06F 17/30* | (2006.01) |
| *G06F 3/0482* | (2013.01) |
| *G06F 3/023* | (2006.01) |

(Continued)

(52) U.S. Cl.
CPC ........... *G06F 3/0482* (2013.01); *G06F 3/0237* (2013.01); *G06F 3/0338* (2013.01); *G06F 3/0489* (2013.01); *G06F 3/04842* (2013.01); *G06F 17/3053* (2013.01); *G06F 17/30554* (2013.01); *G06F 17/30899* (2013.01); *H04M 1/274558* (2013.01)

(58) Field of Classification Search
None
See application file for complete search history.

(56) References Cited

U.S. PATENT DOCUMENTS

| | | |
|---|---|---|
| 3,937,939 A | 2/1976 | Frenkel |
| 5,128,672 A | 7/1992 | Kaehler |

(Continued)

FOREIGN PATENT DOCUMENTS

| | | |
|---|---|---|
| CN | 1199302 | 11/1998 |
| DE | 3123596 | 6/1981 |

(Continued)

OTHER PUBLICATIONS

European Search Report dated Dec. 1, 2006 for PCT/AU2002/01114.

(Continued)

*Primary Examiner* — Son T Hoang
(74) *Attorney, Agent, or Firm* — Jones Day

(57) ABSTRACT

A database for selecting database items, where the database items are indexed by a list of item identifiers. The item identifiers may be in the form of text. An initial display is generated which includes one or more parts of the item identifiers. Selection of the one or more parts may be made and results in the generation of a display of a further one or more parts for selection. The further one or more parts may be selected in order to add to the selected one or more parts to build a larger part or whole of an item identifier. Selection from a large list of item identifiers may be carried out in a relatively short time period.

14 Claims, 9 Drawing Sheets

(51) Int. Cl.
*G06F 3/0489* (2013.01)
*H04M 1/2745* (2006.01)
*G06F 3/0338* (2013.01)
*G06F 3/0484* (2013.01)

(56) References Cited

U.S. PATENT DOCUMENTS

| | | | |
|---|---|---|---|
| 5,263,174 A | 11/1993 | Layman | |
| 5,299,125 A | 3/1994 | Baker et al. | |
| 5,398,023 A | 3/1995 | Murray | |
| 5,496,992 A | 3/1996 | Madan et al. | |
| 5,633,912 A | 5/1997 | Tsoi | |
| 5,724,069 A | 3/1998 | Chen | |
| 5,754,655 A | 5/1998 | Hughes et al. | |
| 5,787,417 A | 7/1998 | Hargrove | |
| 5,797,098 A | 8/1998 | Schroeder et al. | |
| 5,894,276 A | 4/1999 | Altidor et al. | |
| 5,896,321 A | 4/1999 | Miller et al. | |
| 5,901,222 A | 5/1999 | Macor | |
| 5,911,485 A | 6/1999 | Rossmann | |
| 5,953,541 A | 9/1999 | King et al. | |
| 6,009,444 A | 12/1999 | Chen | |
| 6,011,554 A | 1/2000 | King et al. | |
| 6,032,053 A | 2/2000 | Schroeder et al. | |
| 6,047,196 A | 4/2000 | Makela et al. | |
| 6,055,439 A | 4/2000 | Helin et al. | |
| 6,150,962 A | 11/2000 | Rossmann | |
| 6,223,059 B1 | 4/2001 | Haestrup | |
| 6,247,043 B1 | 6/2001 | Bates et al. | |
| 6,264,146 B1 | 7/2001 | Hill et al. | |
| 6,311,125 B1 | 10/2001 | Okano et al. | |
| 6,377,965 B1 | 4/2002 | Hachamovitch et al. | |
| 6,580,932 B1 | 6/2003 | Finke-Anlauff | |
| 6,744,423 B2 | 6/2004 | Kraft et al. | |
| 6,748,242 B1 | 6/2004 | Dunleavy | |
| 6,792,287 B1 | 9/2004 | Tuomela et al. | |
| 6,826,566 B2 | 11/2004 | Lewak et al. | |
| 7,185,286 B2 | 2/2007 | Zondervan et al. | |
| 7,443,316 B2 | 10/2008 | Lim | |
| 7,487,147 B2 | 2/2009 | Bates et al. | |
| 7,543,244 B2 | 6/2009 | Matthews et al. | |
| 7,616,191 B2 | 11/2009 | Matta | |
| 7,669,111 B1 | 2/2010 | Krause et al. | |
| 7,793,228 B2 | 9/2010 | Mansfield et al. | |
| 7,836,044 B2 | 11/2010 | Kamvar et al. | |
| 7,886,233 B2 | 2/2011 | Rainisto et al. | |
| 2001/0012769 A1 | 8/2001 | Sirola et al. | |
| 2001/0018351 A1 | 8/2001 | Hino et al. | |
| 2002/0049795 A1 | 4/2002 | Freeman | |
| 2002/0061770 A1 | 5/2002 | Ozaki | |
| 2002/0087979 A1* | 7/2002 | Dudkiewicz et al. | 725/34 |
| 2002/0091690 A1 | 7/2002 | Bailey et al. | |
| 2002/0151327 A1 | 10/2002 | Levitt | |
| 2002/0183099 A1 | 12/2002 | Lee | |
| 2003/0073414 A1 | 4/2003 | Capps | |
| 2003/0078069 A1 | 4/2003 | Lindeman | |
| 2003/0182274 A1 | 9/2003 | Oh | |
| 2004/0105714 A1 | 6/2004 | Eo | |
| 2004/0163032 A1 | 8/2004 | Guo et al. | |
| 2004/0186819 A1* | 9/2004 | Baker | 707/1 |
| 2004/0192276 A1 | 9/2004 | Wesby | |
| 2005/0010605 A1 | 1/2005 | Conrad et al. | |
| 2005/0188330 A1 | 8/2005 | Griffin | |
| 2005/0233769 A1 | 10/2005 | Tanaka et al. | |
| 2005/0270270 A1* | 12/2005 | Chadha | G06F 3/0237 345/157 |
| 2006/0009861 A1 | 1/2006 | Bonasia et al. | |
| 2006/0031591 A1 | 2/2006 | Hollstrom et al. | |
| 2006/0146028 A1 | 7/2006 | Chang et al. | |
| 2006/0217953 A1 | 9/2006 | Parikh | |
| 2006/0221058 A1 | 10/2006 | Fux et al. | |
| 2006/0265208 A1* | 11/2006 | Assadollahi | 704/9 |
| 2006/0265648 A1 | 11/2006 | Rainisto | |
| 2006/0265668 A1 | 11/2006 | Rainisto | |
| 2006/0293889 A1* | 12/2006 | Kiss et al. | 704/235 |
| 2006/0294462 A1 | 12/2006 | Blair et al. | |
| 2007/0016862 A1 | 1/2007 | Kuzmin | |
| 2007/0060114 A1 | 3/2007 | Ramer et al. | |
| 2007/0089070 A1 | 4/2007 | Jaczyk | |
| 2007/0179776 A1 | 8/2007 | Segond et al. | |
| 2009/0192786 A1* | 7/2009 | Assadollahi | G06F 3/0234 704/9 |
| 2009/0327888 A1 | 12/2009 | Woolf et al. | |
| 2010/0010963 A1 | 1/2010 | Dinn | |

FOREIGN PATENT DOCUMENTS

| | | |
|---|---|---|
| DE | 10019727 | 10/2001 |
| EP | 624965 | 11/1994 |
| EP | 789224 | 8/1997 |
| EP | 1022644 | 7/2000 |
| FR | 2751442 | 1/1998 |
| GB | 2317531 | 3/1998 |
| GB | 2357220 | 6/2001 |
| GB | 2363290 | 12/2001 |
| JP | 09-083402 | 7/1995 |
| JP | 407240776 | 9/1995 |
| JP | 10293640 | 11/1998 |
| JP | 2000267787 | 9/2000 |
| JP | 2002149345 | 5/2002 |
| JP | 2005-159250 | 7/2005 |
| NL | 1011027 | 9/2000 |
| WO | 2000/049731 | 8/2000 |
| WO | 2000/059181 | 10/2000 |
| WO | 2001/005047 | 1/2001 |
| WO | 2001/067725 | 9/2001 |
| WO | 2002/008876 | 1/2002 |
| WO | 2002/013001 | 2/2002 |
| WO | WO 02/39244 | 5/2002 |
| WO | WO 02/069240 | 9/2002 |
| WO | 2002/093338 | 11/2002 |
| WO | 2003021418 | 3/2003 |
| WO | WO 03/077102 | 9/2003 |
| WO | WO 2004/017188 | 2/2004 |
| WO | 2005/064445 | 7/2005 |
| WO | 2006/100505 | 9/2006 |
| WO | 2007/019610 | 2/2007 |
| WO | WO 2008/080192 | 7/2008 |
| WO | WO 2008/106729 | 9/2008 |

OTHER PUBLICATIONS

International Search Report dated Apr. 8, 2008 from International Application No. PCT/AU2008/000297.
International Search Report dated Feb. 6, 2008 from International Application No. PCT/AU2007/002010.
International Search Report dated Oct. 25, 2002 from International Application No. PCT/AU2002/001154.
International Search Report dated Aug. 29, 2006 from International Application No. PCT/AU2006/001151.
International Search Report dated Oct. 16, 2002 from International Application No. PCT/AU2002/01114.
"It's a Nokia . . . Game Boy Advance?", Jorgen Sundgot, InfoSyncWorld, Oct. 11, 2001 <http://www.infosyncworld.com/news/n/986.html>.
"iTAP" Predictive Text Input Technology Technical Paper Lexicus, A Division of Motorola, Version 1.0, Jun. 26, 2002, pp. 1-11. Retreived from the Internet on Aug. 28, 2006 at URL: http://www.toptrend.com.tw/library/product%20line/Lexicus/iTAP/iTAP%20Technical%20Paper%20for%20ESC.pdf.
"New Nokia 5510 is Entertainment Phone", Ana Leticia Sigvartsen, InfoSatellite.com, Oct. 11, 2001, <http://www.infosatellite.com/news/2001/10/a111001nokia_5510.htm>.
"Nokia 5510 User's Guide", Copyright 2001-2002, Selected Pages. Available at: <http://nds1.nokia.com/phones/files/guides/5510_usersguide_en.pdf>.
<www.francemobiles.com/telmob/pack/itineris/pa086271.php?from=aol>.
Examination Report dated Apr. 11, 2008 from Australian Application No. 2002331407.

(56) References Cited

OTHER PUBLICATIONS

First Office Action dated Mar. 10, 2006 for Chinese Patent Application No. 02825059.1.
Supplemental Search Report dated Dec. 1, 2006 for European Patent Application No. 02766922.5.
Examination Report dated Nov. 15, 2010 for European Patent Application No. 02766922.5.
Examination Report dated Feb. 17, 2010 for European Patent Application No. 02766922.5.
Examination Report dated Oct. 17, 2007 for European Patent Application No. 02766922.5.
Examination Report dated May 22, 2007 for European Patent Application No. 02766922.5.
Supplemental Search Report dated Feb. 19, 2007 for European Patent Application No. 02766922.5.
Supplemental Search Report dated Mar. 2, 2011 for European Patent Application No. 08714345.
First Office Action dated Feb. 12, 2010 for Chinese Patent Application No. 200710153468.4.
Examination Report dated Jun. 22, 2011 for Australian Patent Application No. 2010200095.
Examination Report dated Sep. 29, 2009 for New Zealand Patent Application No. 566172.
Examination Report dated Apr. 12, 2011 for New Zealand Patent Application No. 566172.
First Office Action dated Jun. 26, 2009 for Chinese Patent Application No. 2006800364961.
Examination Report dated Feb. 10, 2010 for Singapore Patent Application No. 200801128-0.
Examination Report dated Oct. 29, 2010 for Australian Patent Application No. 2006281970.
"Optimizing predictive text entry for short message service on mobile phones" by How et al. School of Computing, National University of Singapore, 2005. Retrieved from the Internet: http://en.scientificcommons.org/43594032.
"An Efficient Text Input Method for Pen-based Computers" by Toshiyuki Masui, Sony Computer Science Laboratory Inc., Shinagawa, Tokyo, Japan. In: Proceedings of the ACM Conference on Human Factors in Computing Systems (CHI'98), Apr. 1998. Retrieved from the Internet: http://www.pitecan.com/papers/CHI98/CHI98.pdf.
Various Website Screenshots for WayBackMachine for n-e-ware.com and related websites; Various Dates.
"The Use of Syntax in Word Completion Utilities" by Afsaneh Fazly, Graduate Department of Computer Science, University of Toronto, 2002, Retrieved from the Internet: http://www.cs.toronto.edu/pub/gh/Fazly-thesis.pdf.
KeyStick Text Entry System for Series 60 Mobile Phones Version 2.8.0; 2003.
International Search Report dated Jan. 15, 2002 from International Patent Application No. PCT/AU2002/001467.
Office Action dated Sep. 27, 2011 for Japanese Application No. 2008-525341 with English Translation.
Communication from European Patent Office dated Apr. 16, 2013 for EP 06774802.

\* cited by examiner

| Andre Jones |
|---|
| Anne Parkes |
| John Smith |
| John Sykes |
| John Jones |
| Jane Smith |
| Jim Cook |
| Peter Smith |

FIGURE 7

PROCESS AND APPARATUS FOR SELECTING AN ITEM FROM A DATABASE

CROSS REFERENCE TO RELATED APPLICATION

This application is a continuation of U.S. application Ser. No. 14/166,465 filed Jan. 28, 2014, which is a continuation of U.S. application Ser. No. 13/736,548 filed on Jan. 8, 2013, now U.S. Pat. No. 8,676,852 issued Mar. 18, 2014, which is a continuation of U.S. application Ser. No. 13/349,204 filed on Jan. 12, 2012, now U.S. Pat. No. 8,375,058 issued on Feb. 12, 2013, which is a continuation of U.S. application Ser. No. 11/990,338 filed Aug. 26, 2009, now U.S. Pat. No. 8,140,560, issued Mar. 20, 2012, which is the National Phase application of International Application No. PCT/AU2006/001151, filed Aug. 11, 2006, which designates the United States and was published in English and which claims the benefit to Australian provisional application no. 2005904378, filed Aug. 12, 2005. Each of these applications, in their entirety, are incorporated herein by reference.

FIELD OF THE INVENTION

The present invention relates to an improved process and apparatus for selecting an item from a database, and more particularly, but not exclusively, relates to a method and apparatus for rapidly selecting items from a list of items identified by a text field.

BACKGROUND OF THE INVENTION

There are many applications on computing devices which require selection from a list where the item identifier for the list is text based. These include selecting a contact from an address book, selecting a record from a database, selecting a word from a dictionary, etc.

The user of such systems has to enter enough information to narrow a search of the list down to a single entry to be selected. This usually entails entering several of the initial letters of the search term resulting in a smaller subset of the list, then scrolling through the subset to manually point out the desired item.

This can be a cumbersome process requiring the user to be able to enter any letter in their language's alphabet as well as possibly numbers and other symbols. This is particularly onerous on small, hand held devices such as mobile phones, personal digital assistants (PDAs), remote controls, etc.

On hand held devices with a keypad such as mobile phones (FIG. 1), the try of alphabetic characters as well as numerics and symbols is achieved through a cumbersome system of multiply pressing the 12 number keys (0 to 9 and "*" and "#"). This method has the disadvantages of:

Being a complicated, unnatural system which needs to be learnt,
Requiring accurate presses of generally very small buttons resulting in accidental pressing of adjacent buttons,
Requiring the user to be able to read and discern very small labels on the buttons,
Requiring constant shift of gaze between buttons and screen to track the input,
Only allowing the entry of one character at a time, not a group of characters at a time.

Other handheld devices take input through a touch screen such as PDAs (FIG. 2). These allow text input through generally two methods: an on-screen keyboard and handwriting recognition.

The on-screen keyboard method involves presenting an image of a keyboard on the screen. The buttons on this on-screen keyboard are too small to be selected using fingers so a stylus is required. This results in a slow, error prone selection of individual characters with the disadvantages:

Access to numbers and additional symbols usually requiring at least two presses as they require the keyboard to go into another mode to allow access to them,
Small key images are hard to see for those with any impairment of vision and hard to select for those with limited dexterity,
Characters are only entered one at a time.

Handwriting recognition systems have the disadvantage of a high error rate in recognising characters unless either the system is trained with the user's handwriting or the user learns a set of distinctive ways to input letters that are amenable to the device's programming. This method has the disadvantages of:

Needing a stylus for input,
Being slow to enter each letter,
Requiring a constant cycle of entry, checking of accuracy of the entry and correction of misinterpretation of entries,
Characters are only entered one at a time.

Even using a fully fledged keyboard to specify the characters to select an object has disadvantages:

It is still necessary to enter one character at a time,
It is still necessary to enter enough characters to generate a manageable subset list and then select from it, the alternative would be to enter sufficient characters each time to uniquely identify the entry which may require almost all of the entry to be specified,
Except for adept touch typists there is still a need to constantly move one's gaze between the keyboard and the screen.

There is need for an improved method of selecting items from a list.

SUMMARY OF THE INVENTION

In accordance with a first aspect, the present invention provides a method of selecting database items from a database, the database items being indexed by a list of item identifiers, the method comprising the steps of:

generating an initial display including one or more parts of item identifiers for selection,
enabling selection of the one or more parts and in response to selection of the one or more parts,
generating a display of a further one or more parts for selection, and
enabling selection of the further one or more parts in order to add to the selected one or more parts to build a larger part or whole of an item identifier.

In one embodiment, the invention entails a method of selecting an item from a list indexed by a text based field. Preferably, the invention allows for selection from the list by presenting one or more word sections, (the item identifier parts in this embodiment), containing one or more characters, at a time in a list for the user to select from.

Preferably, the word sections presented are based on a knowledge of the text indices in the list and the likelihood of the word sections to be the ones the user wants to enter.

Preferably, where the list of expected word sections does not contain the desired entry the user is given an option to list "more" word sections and is presented with a new list which indicates the next most likely set of word sections.

Preferably, when a word section is selected, a new list of word sections is presented to form a continuation of the text selection based on the word sections selected so far being the start of the desired selection Preferably, once all the word sections have been selected, the item in the list is identified and any associated action, such as presenting a telephone book contact's contact details, is carried out.

Preferably, the word sections are presented as labels on the screen to be selected by various methods depending on the type of device.

Preferably, where the device is a PC, the word sections would be selected by mouse presses or mapping to keyboard keys.

Preferably, where the device has a touch screen such as PDA or Tablet PC, the word sections would be selected by pointing at the labels with either a finger or stylus.

Preferably, where the device has a small screen and a joystick such as a mobile telephone or watch sized device, the word sections should be selectable from a menu which indicates which word section is selected for corresponding movements of the joystick.

Preferably, where the device has function keys with the ability to associate an on-screen label with a button press the word sections would be presented for selection as labels with corresponding function keys.

In accordance with a second aspect, the present invention provides a method of selecting database items from a database, the database items being indexed by a list of item identifiers, comprising the steps of enabling a display of one or more parts of item identifiers for selection, the item identifiers being generated on a display being chosen for generation in accordance with predetermined criteria.

In accordance with a third aspect, the present invention provides an apparatus for selecting database items from a database, the database items being indexed by a list of item identifiers, the apparatus comprising a display, an input means, a generating means for generating an initial display including one or more parts of item identifiers for selection, means for enabling selection via the input means of the one or more parts, means responsive to selection of the one or more parts for generating a display of a further one or more parts for selection, means enabling selection via the input means of the further one or More parts, and addition means to add the further one or more parts to the selected one or more parts to build a larger, or whole of an item identifier.

In accordance with a fourth aspect, the present invention provides an apparatus for selecting database items from a database, the database items being indexed by a list of item identifiers, comprising a means enabling a display of one or more parts of item identifiers for selection, the means selecting the item identifiers for display in accordance with predetermined criteria.

BRIEF DESCRIPTION OF THE DRAWINGS

Features and advantages of the present invention will become apparent from the following description of embodiments thereof, by way of example only, with reference to the accompanying drawings, in which:

FIG. 7 is a representation of an example table of words.

DESCRIPTION OF PREFERRED EMBODIMENT

The following description of the present invention relates to selection of a contact from an address book of a mobile telephone. The invention is however not limited to this application and may be implemented on any device with computational processing ability on any list which is indexed by a text based value.

Figure 1:
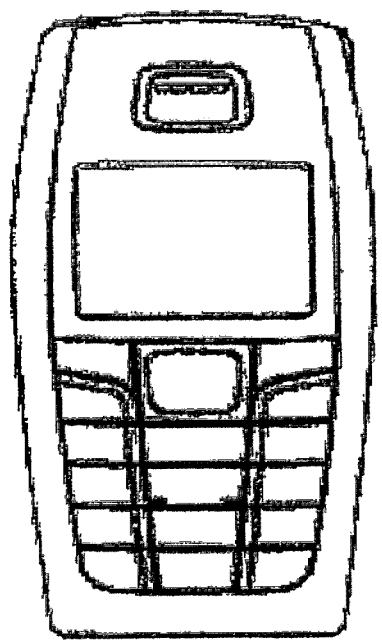
FIG. 1 is a representation of a traditional mobile telephone layout.
Figure 2:
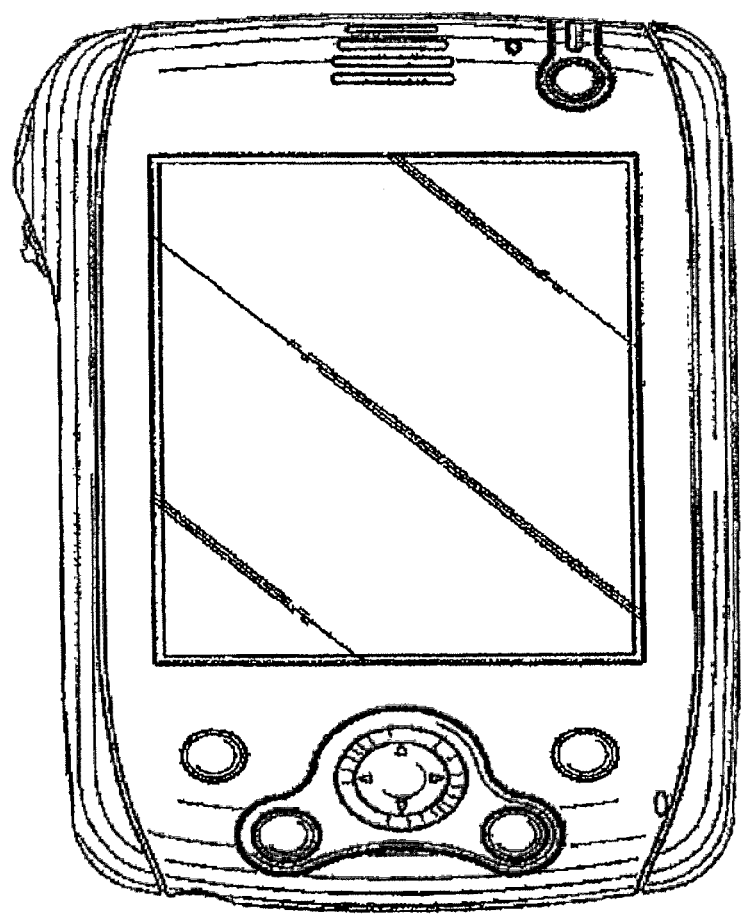
FIG. 2 is a representation of a touch screen input device.
Figure 3:
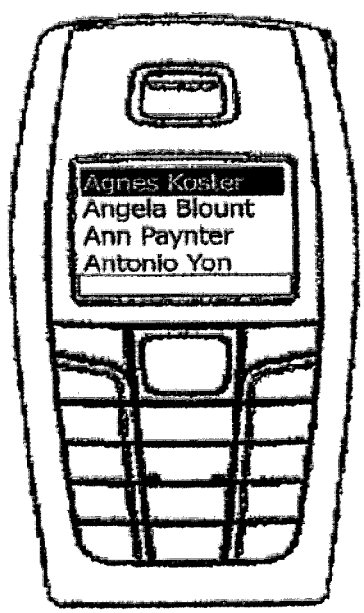
FIG. 3 is a representation of a traditional address book at start of selection process. Image shows first four entries hi address book with selection indicator over first one. There is no entry in search refinement
Figure 4:
FIG. 4 is a representation of a selection from reduced list of contacts from an address book using a traditional selection process. Image shows user has entered "je" to refine the search to a manageable number of entries and then used the cursor to move the highlight to specify "Jessie Lares"

The conventional way of selecting a contact from an address book on a mobile telephone entails the user following the sequence:

1. The user starts the address book application and is presented with a the full list of all contacts in the address book, (FIG. 3)
2. Using the multi-tap feature on the device to enter characters with multiple presses of keypad keys, the user enters the first letter of the name they want to find,
3. This results in the list of names presented changing from the entire address book to only those names starting with the specified letter,
4. The user can now decided to use the joystick to move the selection to the desired contact and select it (FIG. 4), if however the list is still too long the user goes back to step 2 above to enter the next character and proceeds until the list is short enough to find the contact,
5. Once the contact is selected, their information is presented and the user is given the option of calling them, emailing them, etc.

In an embodiment of the current invention the above process can be streamlined greatly by presenting the user with the following sequence:

1. The user starts the address book application which is implemented based on the present invention, the user is presented with 4 strings in a circular menu indicating the strings are selected by movements of the joystick in the directions left, right, up and down (FIG. 5), these initial four options are the four most likely word sections in the database at the start of a contact name based on an analysis of the frequency of words in the address book;
2. If the user sees the word section that starts, or is a Continuation the contact they want to select they move the joystick in the indicated direction to select that word section, appending it to the name thus far specified. The next set of most likely word sections which continue the name thus far specified are then presented (FIG. 6), if the selection is not complete the user repeats this step 2;
3. If the word section the user desires is not presented, they activate the "more" function, in this case a press in of the joystick to be presented with the next most likely set of four options to continue the name thus far specified the user then repeats step 2;

4. Once the user has completed the name the user is then presented with their information and the user is given the option of calling them, emailing them, etc.

Using an address book application implemented with the present invention as described above has the following advantages over the traditional system as described previously:

There are significantly less key presses or movements of the joystick as the mostly letters are presented first and it is likely that it will be possible to specify several letters of the name at a time, Only the joystick has been used so there is no need to transfer the thumb or finger between buttons and risk mis-hitting buttons, The labels selected from are presented on the screen rather than being printed on the buttons meaning the user is able to maintain their gaze on the screen the entire time rather than constantly flick between the screen and the keypad, Another advantage of on-screen labels is that it is possible to increase the size of the labels to make them more readable for those with vision impairment, an option not possible for labels on small keypad keys.

It should be obvious to someone skilled in the art that the present invention has much broader application than just the example listed above, as well as a mobile phone, the present invention can be used to improve list selection on other devices including but not limited to personal computers, tablet PCs, PDAs, remote controls and small watch sized devices.

Also, as well as the above sample application the present invention can be used to select an item from any list which is indexed by a text based value; The list could be of any size from a handful of entries to a large database of thousands or even millions of entries. The list does not just have to be contacts in an address book, applications could include but are not limited to selection from any text indexed database, for a list of products in an inventory, selection of word definitions from a dictionary, selection of answers from an FAQ (Frequently Asked Question) document, etc.

Implementation

Preferably the present invention would be implemented as software within an application which maintains or allows viewing of some list of information. The list would be accessible through an index field which is text based. The text may be based on any language or symbolic system as long as it can be represented on the screen for selection.

Table of Values

FIG. 7 shows an example table of words which may be the text string indices from which a selection is to be made.

Hierarchical Tree

In order to facilitate selection from the list of text indices using the present invention, the list needs to be processed as a hierarchical tree of word sections. In one variation of the implementation of the present invention in software there may be a pre-processing phase where the list of indices is analysed and the hierarchical tree is generated and stored in some computer accessible memory to assist processing.

The hierarchical tree of word sections is an internal representation of the structure of the words in the list. Where words share the same starting letter or letters those words are added under the same nod; where words diverge a branch in the hierarchical tree is formed. This process continues to form further entries and branches down the tree to correspond with the subsequent letters in the words.

Figure 8:
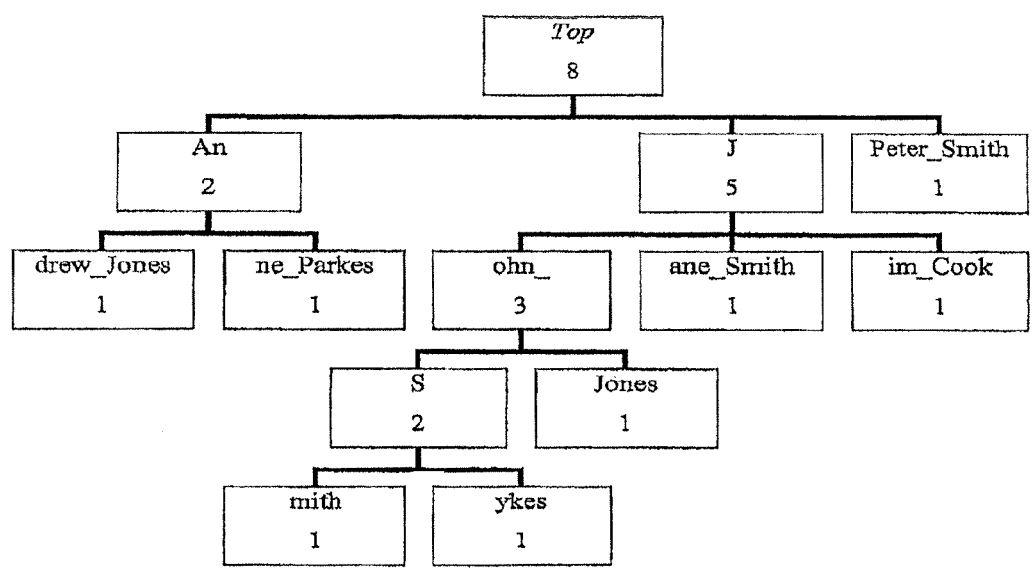
FIG. 8 is a representation of an example structure of tree for words in example table.

As an example, the logical hierarchical tree structure for the list in FIG. 7 is illustrated in FIG. 8. As can be seen, where words have common letters in sequence they share a node in the tree structure, where the characters diverge (for example after the first "n" for "Andrew Jones" and "Anne Parkes") a branch in the tree is formed.

Node Rankings

Associated with each end node is a ranking value. In the most basic of systems this value would be one for each end node but in other systems it could be any number representing a ranking, for instance for a phone book application the number could be the number of times that contact was accessed giving more frequently used contacts higher priority.

For the branch nodes in the tree their ranking value is the sum of all the ranking values of the nodes immediately below them in the tree.

Presenting Options

Figure 9:
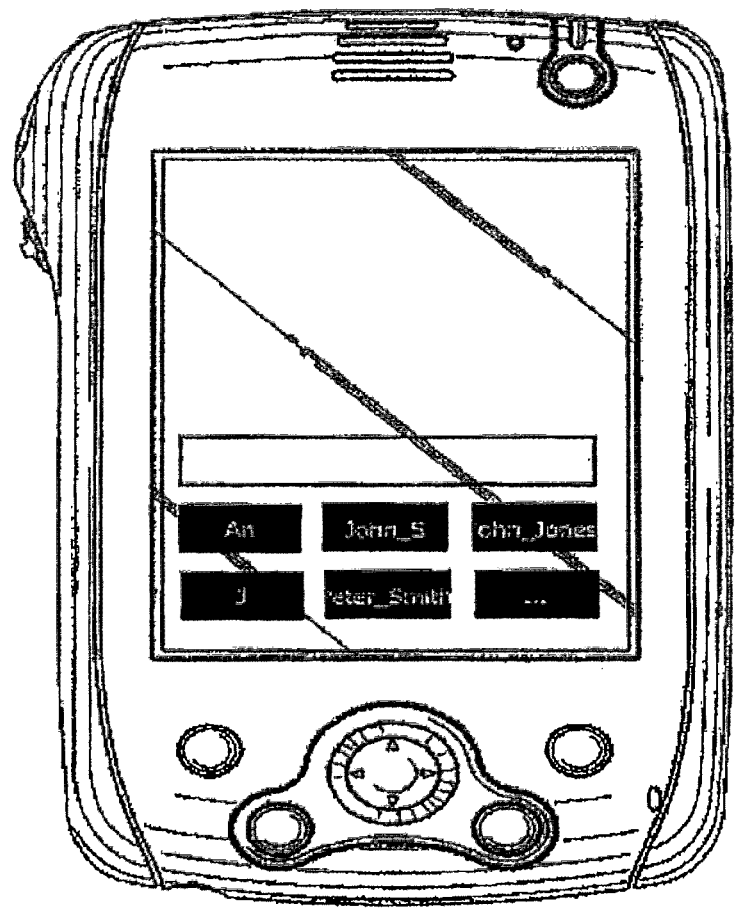
FIG. 9 is a representation of a touch screen option selection.

In an implementation of the present invention, the system presents word section options. The number of options presented depends on the mode by which the options are being selected. On a touch screen the options may be in a 3 by 2 grid to be selected by a stylus (FIG. 9)—in this case the system would be generating up to 5 word sections at a time leaving the sixth menu option to indicate "more" where none of the presented 5 options is applicable.

In the case of a menu driven by a joystick such as that which is commonly found on a mobile phone the system could present up to 4 word section options indicated by presses of the joystick in the four directions (left, right, up and down) and having a press in of the joystick to indicate "more".

Each word section option presented corresponds to a node in the notional hierarchical tree. In order to determine which nodes to present the system will use the following logic:

1. Exclude nodes which have already been presented (i.e. they have been presented to the user and the user has selected "more" to indicate none of those presented are appropriate)
2. Select the nodes with the highest ranking values
3. When assessing the ranking value subtract the ranking value of any nodes below this node in the tree that have been selected. For example, in FIG. 8 ranking value for the node with the string "J" is 5 but if the node for "ohn_" is included in the selection the ranking for "J" should be treated as 2, the sum of the rankings of the unselected nodes.
4. Point 3 above means some iterations may be performed to select the optimum node set
5. Select up to the number of menu choices that are presentable.

Thus for our example tree in FIG. 8. if four word section are to be selected for a joystick based interface, the first four options would be:

| WORD SECTION | RANKING VALUE |
|---|---|
| "An" | 2 |
| "John_" | 3 |
| "J" | 2 (ranking of "J" minus ranking of "ohn_" which is presented separately) |
| "Peter Smith" | 1 |

Figure 5:
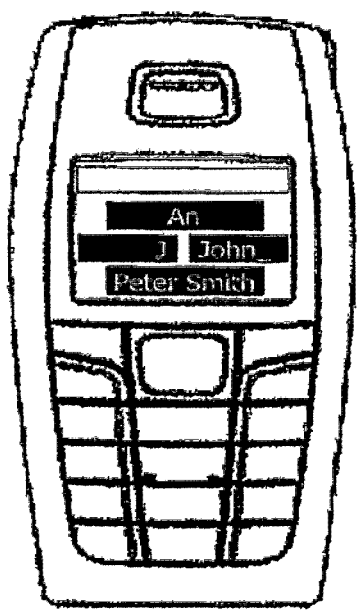
FIG. 5 is a representation of an opening joystick based selection menu using the present invention.

FIG. 5 shows how this selection set may be represented on a joystick based interface.

If the user was to select the "John" option then the options to be presented would be:

| WORD SECTION | RANKING |
|---|---|
| "Smith" | 1 |
| "Sykes" | 1 |
| "Jones" | 1 |

Figure 6:
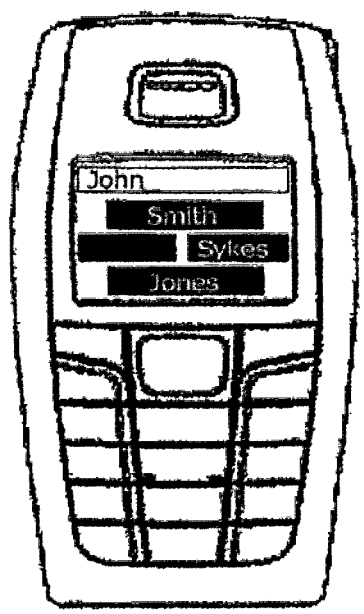
FIG. 6 is a representation name partially specified using the present invention.

FIG. 6 shows how this selection set may be represented on a joystick based interface.

If the user was to select the "An" option from the original Menu then the options to be presented would be:

| WORD SECTION | RANKING VALUE |
|---|---|
| "drew_Jones" | 1 |
| "ne_Parkes" | 1 |

Once the user selects a word section that takes them to the end of the index then the item has been uniquely specified and the system can then perform the processing applicable to the application. In the example of a phone book system the user may be presented with options to initiate a phone call or send a text message to the contact.

As can be seen from the above example, even using just a joystick it is possible to very rapidly narrow a text based search to a single entry with very few joystick actions using the present invention. While the example presented is based on a trivial number of entries, the present invention provides a significant increase in efficiency of selections from lists with many more items as well.

It will be appreciated by persons skilled in the art that numerous variations and/or modifications maybe made to the invention as shown in the specific embodiments without departing from the spirit or scope of the invention as broadly described. The present embodiments are, therefore, to be considered' in all respects as illustrative and not restrictive.

The invention claimed is:

1. A method of selecting database items from a database, the database items being indexed by a list of item identifiers, the method comprising:

generating an initial display including one or more parts of item identifiers for selection by a user;

enabling the selection, by the user, of the one or more parts;

in response to the selection of the one or more parts of item identifiers, generating a display of a further one or more parts of item identifiers for selection, the further one of more parts being selected for display based at least in part on a ranking scheme wherein the further one of more parts of item identifiers being arranged on the display relative to one another and corresponding to at least an up, down, left or right position, and the highest ranked of the further one or more parts of item identifiers being positioned in one of the up, down, left and right positions; and enabling selection, by the user, of the further one or more parts of item identifiers in order to add to the selected one or more parts to build a larger part or whole of a particular item identifier;

wherein the selected one or more parts of item identifiers and the further one or more parts of item identifiers are shorter than a complete word; and wherein selection of the further one or more parts of item identifiers is enabled by a key press corresponding to the relative arrangement of the further one or more parts of item identifiers on the display.

2. The method in accordance with claim 1, comprising the further steps of:

iterating the selection steps until the particular item identifier is completed, and enabling selection, by the user, of the particular item identifier to select the database item.

3. The method in accordance with claim 1, wherein the step of generating the initial display includes selecting the one or more parts of item identifiers to be displayed based on at least one predetermined criterion.

4. The method in accordance with claim 3, wherein the at least one predetermined criterion is a frequency of selection of database items associated within the one or more parts of item identifier.

5. The method in accordance with claim 3, wherein the at least one predetermined criterion is a ranking of the one or more parts of item identifiers in relation to a tree hierarchy classification of the one or more parts of item identifiers.

6. The method in accordance with claim 1, wherein the generating the initial display of the one or more parts of item identifiers includes displaying a plurality of parts of item identifiers.

7. The method in accordance with claim 1, wherein the generating the display includes displaying an entire item identifier.

8. The method in accordance with claim 1, wherein each of the item identifiers includes one or more alphanumeric characters.

9. The method in accordance with claim 8, wherein the item identifier includes a text string.

10. The method in accordance with claim 9, wherein the item identifier includes a word.

11. The method in accordance with claim 1, wherein the database is stored in a memory of a computing device.

12. The method in accordance with claim 11, wherein the computing device is a mobile telephone.

13. The method in accordance with claim 12, wherein the steps of enabling selection allow selections of the one or more parts of item identifiers and the further one or more parts of item identifiers by way of a joystick.

14. The method in accordance with claim 11, wherein the computing device is a PDA.

* * * * *

(12) INTER PARTES REVIEW CERTIFICATE (3445th)
United States Patent                (10) Number:        US 9,436,354 K1
Dinn                                    (45) Certificate Issued:  Feb. 9, 2024

(54) PROCESS AND APPARATUS FOR SELECTING AN ITEM FROM A DATABASE

(71) Applicant: Kevin Dinn

(72) Inventor: Kevin Dinn

(73) Assignee: KANNUU PTY LTD.

Trial Number:

IPR2020-00737 filed Mar. 17, 2020

Inter Partes Review Certificate for:

Patent No.: 9,436,354
Issued: Sep. 6, 2016
Appl. No.: 14/627,914
Filed: Feb. 20, 2015

The results of IPR2020-00737 are reflected in this inter partes review certificate under 35 U.S.C. 318(b).

INTER PARTES REVIEW CERTIFICATE
U.S. Patent 9,436,354 K1
Trial No. IPR2020-00737
Certificate Issued Feb. 9, 2024

AS A RESULT OF THE INTER PARTES REVIEW PROCEEDING, IT HAS BEEN DETERMINED THAT:

Claims 1-14 are cancelled.

\* \* \* \* \*